Figure 1:
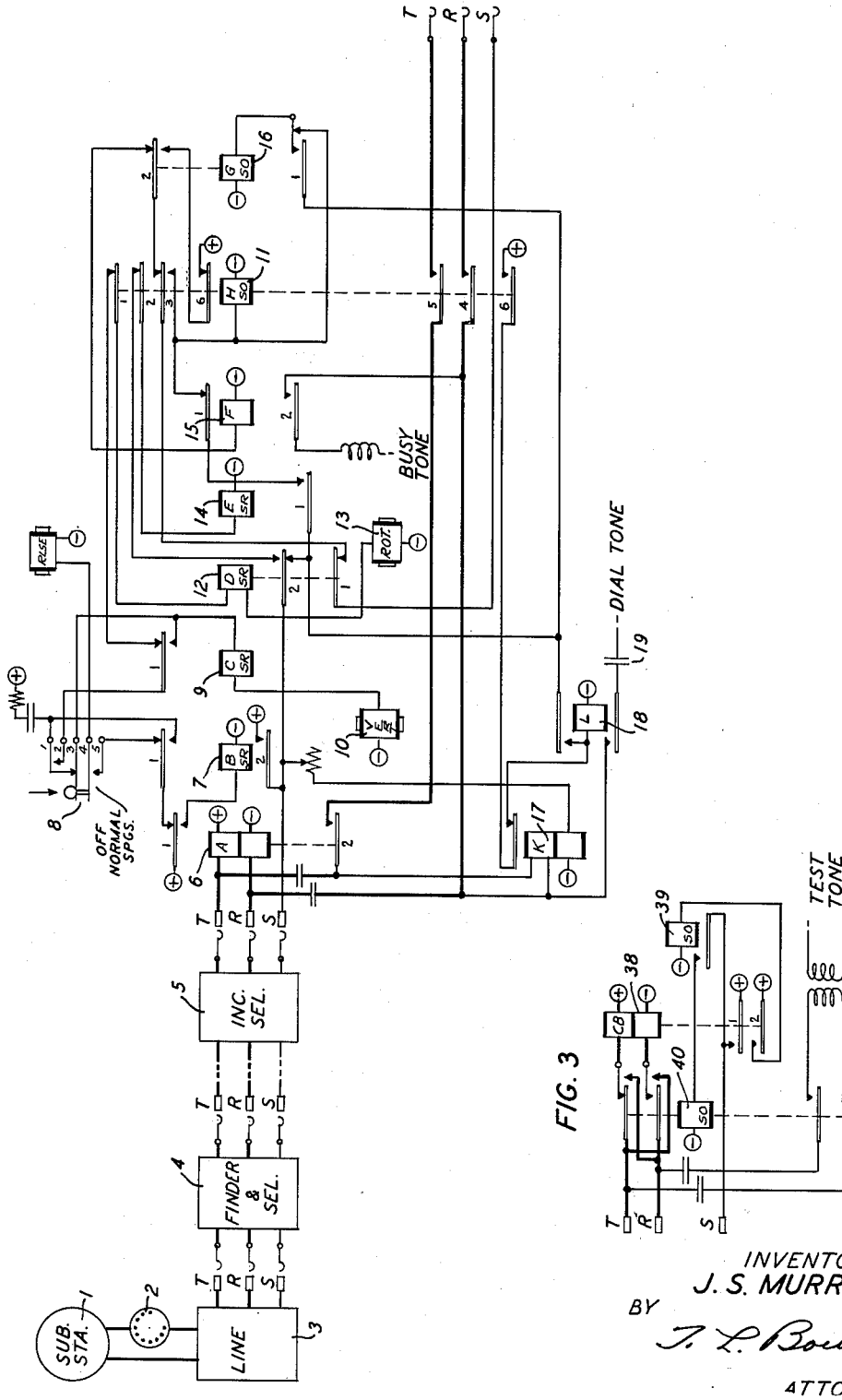

Jan. 24, 1956   J. S. MURRAY   2,732,442
TESTING MEANS FOR TELECOMMUNICATION SYSTEM
Filed July 19, 1952   2 Sheets-Sheet 1

INVENTOR
J. S. MURRAY
BY
J. L. Bowes
ATTORNEY

United States Patent Office 2,732,442
Patented Jan. 24, 1956

2,732,442

TESTING MEANS FOR TELECOMMUNICATION SYSTEM

James S. Murray, Tampa, Fla., assignor, by mesne assignments, to General Dynamics Corporation, a corporation of Delaware Application July 19, 1952, Serial No. 299,857

6 Claims. (Cl. 179—175.21)

This invention relates to testing means and particularly to means employed in a telecommunication system for making routine tests of circuits and apparatus located at a distant point.

The object of the invention is to provide a testing device which may be operated from a distant point to test a plurality of different selected circuits and to report back the generally satisfactory or unsatisfactory condition of such circuits.

The invention consists broadly of means at a distant point as at an unattended office which may be driven into connection with a circuit thereat and by simple means to report back, the busy or idle condition thereof, and if idle the normal or abnormal reaction of such circuit to seizure. Means is also provided to seize such a selected circuit and hold it against seizure by other normally operating means so that it cannot produce malfunctioning of other circuits and apparatus thereat.

In a specific embodiment of the invention herein disclosed a simple step-by-step selector switch having a special operating circuit is provided in an unattended office, which may be seized in a conventional manner and then driven also in a conventional manner to any desired set of outgoing terminals. If the circuit connected thereto is busy, means is provided to prevent interference with such busy circuit and to return a distinctive busy indication to the operator. If the selected circuit is not busy then an attempt is made to seize the circuit and if this succeeds and the circuit responds in the conventional manner another distinctive satisfaction indication is given to the operator so that further testing of other circuits may be immediately carried out. If the selected idle circuit does not respond in the conventional manner as by failing to return the barring potential on its sleeve, then the absence of any satisfaction signal serves as an indication of such failure. Under these conditions the test switch immediately places a barring potential on such seized circuit to hold it busy against other selecting devices. The operator may then leave the connection until repairs can be made or, alternatively, may either release the test selector or move it along to another circuit.

A feature of the invention is a test switch in a distant location which may be seized and set on the terminals of a plurality of circuits thereat and which will return automatically a plurality of different signals indicative of the satisfactory or unsatisfactory condition of such circuits. In case an unsatisfactory circuit is encountered the test switch may be left in possession thereof to mark the unsatisfactory circuit until a repairman can attend to the difficulty.

Another feature of the invention is a distantly located test switch which may be set by dial pulses on to the terminals of a circuit to be tested and which in response to the encounter with an unsatisfactory condition will prepare a stepping circuit responsive to further control by the tester whereby the switch may be advanced to another circuit terminal to carry out further testing operations.

Other features will appear hereinafter.

Figure 2:
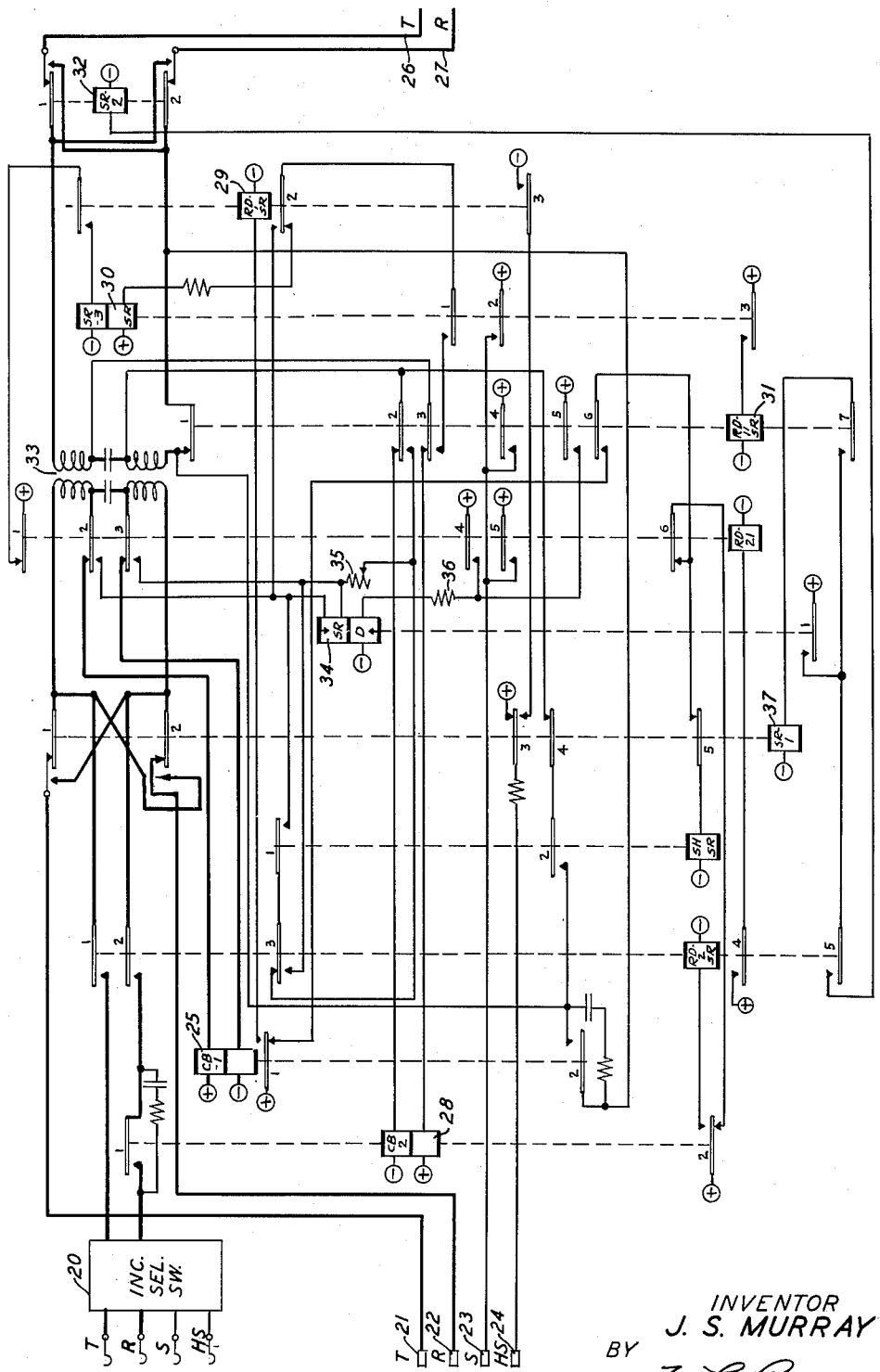

The drawings consist of two sheets having three figures, as follows:

Fig. 1 is a schematic circuit diagram having an indication of apparatus at an attended office by means of which a maintenance worker may establish a connection to a trunk test switch being shown in some detail;

Fig. 2 is a schematic circuit diagram of one end of a two way trunk circuit which may be reached by means of the trunk test switch in the unattended office and which is connected to a trunk reaching either back to the attended office or to some other distant point, and Fig. 3 is a schematic circuit diagram of a special line arrangement which may be used in conjunction with the test switch of the present invention.

The apparatus at the attended office is shown schematically as a subscriber station 1 provided with a dial 2 and extending through a line circuit 3 whereby the calling line may be picked up and extended by the finder selector combination 4. Thereafter the tester using the substation 1 may dial an incoming selector 5 to the terminals of the test switch forming the main portion of Fig. 1. The substation 1 may be a conventional substation or it may be appaartus at a test board or wire chief's desk. The line circuit 3, the finder-selector 4 and the incoming selector 5 are conventional. When the incoming selector has been driven to the terminals of the test switch a bridge will be established across the tip and ring so that the A relay 6 will become operated through its grounded upper winding and its lower winding connected to battery. Thereupon the B relay 7 will be operated in an obvious circuit and will immediately place ground on the sleeve in a conventional manner. The tester then drives the test switch to a particular outgoing terminal, such as that shown in Fig. 2. In response to the first series of dial impulses the A relay 6 will intermittently release and during each such releasing movement a ground will be connected over armature 1 and back contact of relay 6, the armature 1 and front contact of the B relay 7, springs 1 and 3 of the off normal set 8, the winding of the first slow relay 9 and thence through the vertical magnets 10 to battery. The first slow relay 9 and the vertical magnets will respond to each impulse of the series to drive the brushes of the selector in the primary direction. The vertical magnet 10 will respond to each impulse separately whereas the slow releasing relay 9 will respond to the train of impulses as a whole. On the first vertical movement of the switch the off normal springs 8 will operate so that the following impulses will be extended through springs 1 and 2 of the off normal set, the armature 1 and front contact of the slow releasing relay 9 and thence to the vertical magnet. At the end of this series of pulses the slow release relay 9 will return to normal. Thereafter the tester dials again and this time the pulses of the train are transmitted from ground, armature 1 and back contact of the A relay 6, armature 1 and front contact of the B relay 7, springs 1 and 2 of the off normal set, armature 1 and back contact of the slow releasing relay 9, back contact and armature 1 of the H relay 11, winding of the D slow releasing relay 12, the rotary magnets 13 to battery. The rotary magnets 13 respond to the impulses of the train separately, whereas the slow releasing relay 12 responds to the train of impulses as a whole. The brushes of the selector are thereby set on the terminals of a given trunk circuit which is to be tested. If the trunk circuit is busy then a ground will be found on the sleeve thereof.

During the dialling of the last digit and during the operation of the slow releasing relay 12, a circuit is established from ground, front contact and armature 2 of the B relay 7, armature 2 and front contact of the D relay 12, back contact and armature 2 of the H relay 11 through the winding of the E slow releasing relay 14. This relay becomes operated so that upon the release of the slow releasing relay 12 a circuit will momentarily be established from ground at the front contact of armature 2 of the B relay 7 through the armature 2 and back contact of the D relay 12, the armature and front contact of the E relay 14, armature 1 and back contact of the F relay 15 and thence in one direction through the winding of the slow operating relay 11 to battery and in another direction through the normal contacts of armature 1 of the G relay 16 to battery. The H relay 11 and the G relay 16, however, are slow to operate and before they can operate a circuit is established from the grounded sleeve through armature 1 and back contact of the slow releasing relay 12, armature 3 and back contact of the H relay 11, armature 2 and back contact of the G relay 16, winding of the F relay 15 to battery. This relay immediately opens the energizing circuits of the H and G relays so that they cannot become operated. The F relay 15, therefore, becomes operated from the sleeve of the busy trunk and connects a source of busy tone through its armature 2 and front contact to the ring conductor of the test switch to be transmitted back over the established connection to the substation 1. The receipt of this busy tone indicates to the tester that the trunk which he has selected has been found to be busy.

The tester may now advance the switch to an additional rotary movement by dialing another digit. The next digit, generally "1," establishes a circuit from ground, armature 1 and back contact of the A relay 6, armature 1 and front contact of the B relay 7 and thence over the circuit previously traced through the rotary magnet 13 to cause the selector to step.

If the called line is found to be idle then the F relay 15 does not become operated and since the circuit for the H relay 11 and the G relay 16 is not immediately cut off these two relays will operate. The G relay will lock through its armature 1 and front contact to the ground supplied by the front contact and armature 2 of the B relay 7. The H relay, however, must depend on a ground on the sleeve of the called line for its continued operation. If the circuit of Fig. 2 operates properly such a ground will be immediately returned and this ground will then be traced through the sleeve wiper of the switch, armature 1 and back contact of the D relay 12, armature 3 and front contact of the H relay 11, through the winding thereof to battery, so that if this circuit of Fig. 2 responds properly both the H and G relays will remain operated. When this circuit of Fig. 2 is thus seized a bridge will be placed on the tip and ring conductors thereof which may be traced from the ring conductor through the front contact and armature 4 of the H relay 11, left hand winding of the K relay 17, armature 2 and front contact of the A relay 6, armature 5 and front contact of the tip wiper of the switch so that the calling bridge relay in the trunk circuit becomes operated. The armature 2 and front contact of the A relay 6 constitute dialing contacts and will therefore repeat into the trunk circuit of Fig. 2 the dial pulses sent out from the tester's substation 1. In this manner a distant incoming switch, such as the incoming switch 20 of Fig. 2, will be set on to the terminals of a connector which in turn may be set on to the terminals of a given called line. If the tester in this manner extends a connection from the unattended office over a trunk back to the attended office where he may dial a substation within his reach then he may himself answer the established call. In a conventional manner the answer of the called subscriber will reverse the current flow back into the trunk test switch and thereby cause the release of the K relay 17 so that the L relay 18 may be operated to connect a source of dial tone 19 to the calling line and thus indicate to the tester that the circuit of Fig. 2 has operated properly. It will be noted that upon the operation of the B relay 7 the ground at the front contact of armature 2 thereof is extended over the right hand winding of the K relay 17 to battery so that this relay becomes operated. When the trunk circuit of Fig. 2 is seized and the H relay is operated the current flow from the calling bridge relay through the left hand winding of the K relay 17 is in such direction to aid the right hand winding thereof and hence this K relay 17 remains operated. When, however, the trunk circuit of Fig. 2 operates properly and the current flow is reversed then the left hand winding thereof opposes the right hand winding and the relay releases. Thereupon a ground is extended from the front contact and armature 7 of the H relay 11, the armature and back contact of the K relay 17, the winding of the L relay 18 to battery. This relay locks in an obvious circuit and connects the source of dial tone 19 to the calling line.

If the trunk circuit of Fig. 2 does not operate properly and fails to return a ground on the sleeve, then there will be no circuit for holding the H relay 11 operated and this relay will release. Thereupon a circuit will be established from ground, back contact and armature 6 of the H relay 11, front contact and armature 2 of the G relay 16, back contact and armature 3 of the H relay 11, back contact and armature 1 of the D relay 12 to the sleeve of the called trunk circuit thus putting a busy condition on this defective trunk. The tester may leave this connection thus established until a maintenance man can get to the unattended office and examine and repair the defect. The trunk to the switch of Fig. 1 may therefore be used as a means for holding a defective trunk out of service so that it will not interfere with the normal operation of the unattended office.

*The two way trunk circuit*

The two way trunk circuit of Fig. 2 is shown in complete detail. Such a circuit is approachable through its tip, ring and sleeve terminals 21, 22 and 23 as well as its HS terminal 24 used in certain other applications. When the tip and ring conductors are bridged the calling bridge relay 25 will be operated and through the ensuing operation of the usual slow releasing relays a bridge will be established over the tip and ring conductors 26 and 27 leading to a distant office. At that point the tip and ring conductors are connected to an exact duplicate of Fig. 2 so that the CB-2 relay 28 at that point is operated. This will cause the seizing of the distant incoming selector switch 20 in the normal manner. It is believed to be necessary here only to note that upon the operation of the CB-1 relay 25 the RD-1 relay 29, in turn, the SR-3 relay 30 and, again in turn, the RD-11 relay 31 will be operated. A bridge on the line may then be traced from the tip conductor 26 through the armature 1 and back contact of the SR-2 relay 32, the upper right winding of the repeating coil 33, the armature 3 and front contact of the RD-11 relay 31, the front contact and armature 1 of the SR-3 relay 30, the armature 2 and front contact of the RD-1 relay 29, the upper winding of the SR relay 34, the adjustable resistance 35, the front contact and armature 2 of the RD-11 relay 31, the lower winding of the repeating coil 33, the front contact and armature 2 of the CB-1 relay 25, the armature 2 and back contact of the SR-2 relay 32 to the ring conductor 27. The SR relay is also connected in a circuit from battery, its lower winding, a resistance 36, front contact and armature 5 of the RD-11 relay 31 to ground. In this connection the current flow through the upper winding of the SR relay 34 opposes the energization of the lower winding thereof so that the SR relay does not respond. By means of the adjustable resistance 35 this condition may be assured. The armature 2 and front contact of the CB-1 relay 25 constitute dialing contacts so that the distant CB-2 relay may be operated for the purpose of setting the incoming selector switch 20 thereat.

When the called subscriber at the distant point answers, the current flow through the trunk will be reversed and thus the current flow in the upper winding of the SR relay 34 will be reversed causing this relay now to operate.

Thereupon a circuit is established from ground, armature 1 and front contact of the SR relay 34, front contact and armature 7 of the RD–11 relay 31, the winding of the SR–1 relay 37 to battery. The SR–1 relay 37 by its armatures 1 and 2 now reverses the current flow over the tip and ring conductors of the trunk test switch as hereinbefore noted.

It will be noted that as soon as the SR–3 relay 30 and the RD–11 relay 31 are operated a ground is placed on the sleeve 23 of the connection extending back to the trunk test switch of Fig. 1.

The circuit of Fig. 2 forming one end of a two way trunk circuit is given by way of example. The trunk test switch of Fig. 2 might equally well be set on the terminals of a conventional connector at the unattended office and a call made to a designated called line. Such a called line might be extended back to the attended office so as to be reached by the tester thereat whereby he could simulate the answer of a called subscriber and thus test the capacity of the connector for responding thereto and for reversing the current flow back toward the calling line.

It has been stated hereinabove that the trunks, such as that of Fig. 2, which in a small unattended office are so few in number that they may be mutiplied to otherwise unused terminals in the banks of the test switch, may have their distant incoming switches dialed to any or some particular called line. Fig. 3 shows a simple test tone source which might be selected by the distant incoming switch 20 or by a connector seized thereby. This might be connected to some given unused line number and would operate as follows.

When selected, its calling bridge relay 38 would respond to the bridge placed across the tip and ring. Thereupon relay 38 would ground the sleeve and establish an operating circuit for the slow operating relay 39. After a short given interval this relay would respond and connect the sleeve ground to another slow operating relay 40 (two slow operating relays are not necessary but will produce a longer interval) and this in turn will reverse the line and connect a source of test tone to the tip and ring for transmission over the line to the tester. Thus the answer of a called subscriber may be simulated both by reversing the line in the conventional manner and by placing some tone thereon to test the voice transmission.

What is claimed is:

1. In a switching system, a test switch having access to a plurality of circuits to be tested, said switch having tip, ring and sleeve wipers, a magnet to drive it in a primary direction and a magnet to drive it in a secondary direction to place its said tip, ring and sleeve wipers on corresponding tip, ring and sleeve terminals of one of said circuits, a circuit for said switch including means responsive to encounter with a barring potential on said sleeve terminal for transmitting a busy tone, means responsive to the absence of barring potential on said sleeve terminal for effectively connecting said switch circuit over said tip and ring wipers to said circuit, means responsive to a normal reaction of said seized circuit to seizure for transmitting a different tone and means for preparing a secondary circuit for said secondary direction magnet for further directive operation thereof, said means responsive to said normal reaction of said seized circuit including means for disabling said secondary circuit for said secondary direction magnet.

2. In a switching system, dial pulse means for extending a connection to a distant point, a group of switches thereat accessible to said connection extending means and each being responsive to dial pulses for further extending said connection, connections accessible to said switches, each said switch having means for returning idle line and busy line indications, a special switch included among the switches of said group and responsive to dial pulses in like manner to said switches, a circuit for said special switch for rendering it further responsive to dial pulses for resetting said special switch on a different one of said connections accessible to said switches, and means responsive to a busy condition of a said connection for enabling said resetting circuit.

3. In a switching system, dial pulse means for extending a connection to a distant point, a group of switches thereat accessible to said connection extending means and each being responsive to dial pulses for further extending said connection, connections accessible to said switches each having means to return a signal responsive to seizure thereof by one of said switches, each said switch having means for returning idle line and busy line indications and for relaying said signal from said connections, a special switch included among the switches of said group and responsive to dial pulses in like manner to said switches, a circuit for said special switch for rendering it further responsive to dial pulses for resetting said special switch on a different one of said connections accessible to said switches and means responsive to a busy condition of a said connection for enabling said resetting circuit.

4. In a switching system, dial pulse means for extending a connection to a distant point, a group of switches thereat accessible to said connection extending means and each being responsive to dial pulses for further extending said connection, each said switch having a primary magnet responsive to dial pulses for moving said switch in one direction and a secondary magnet responsive to dial pulses for moving said switch in another direction, connections accessible to said switches each having means to return a signal responsive to seizure thereof by one of said switches, each said switch having means for returning idle line and busy line indications and for relaying said signal from said connections, a special switch included among the switches of said group and responsive to dial pulses in like manner to said switches, a circuit for said special switch for rendering its said secondary magnet further responsive to dial pulses for resetting said special switch on a different one of said connections accessible to said switches and means responsive to a busy condition of a said connection for enabling said resetting circuit.

5. In a switching system, dial pulse means for extending a connection to a distant point, a group of switches thereat accessible to said connection extending means and each being responsive to dial pulses for further extending said connection, each said switch having a primary magnet responsive to dial pulses for moving said switch in one direction and a secondary magnet responsive to dial pulses for moving said switch in another direction, trunks terminating at their distant ends in dial pulse controlled switches, said trunks being accessible to said switches and each having means to transmit a signal responsive to seizure thereof by one of said switches, each said switch having means for transmitting over said extended connection idle line and busy line signals and for relaying said signal from said trunk, a special switch included among the switches of said group and responsive to dial pulses in like manner to said switches, a circuit for said special switch for rendering its said secondary magnet further responsive to dial pulses for resetting said special switch on a different one of said trunks, means responsive to a busy condition of a selected trunk for enabling said resetting circuit and a special circuit accessible to said switches at the distant end of said trunks having means for automatically transmitting signals therefrom over said trunks simulating response to seizure thereof and response of a called subscriber thereto.

6. In a dial switching system, the combination of a trunk test switch and a special response circuit accessible as a called subscriber's circuit for producing a given timed train of reactions in said trunk test switch, including the reaction to the seizure of an idle called subscriber's line, the reaction to the answer of the called subscriber, and the transmission of voice frequency current over the established connection, and dial controlled circuits and apparatus to be tested, means for establishing a connection including serially said trunk test switch, a dial controlled circuit and its apparatus to be tested and said special response circuit, said special response circuit being provided with means to simulate automatically and sequentially the normal response to seizure of a dial controlled circuit and the answer of a called subscriber including both the switchhook circuit changes and the subsequent transmission of voice frequency currents over the established connection, said special response circuit having a source of test tone connectible to said established connection by said means for simulating the answer of a called subscriber.

References Cited in the file of this patent

UNITED STATES PATENTS

| | | |
|---|---|---|
| 1,570,741 | Harden et al. | Jan. 26, 1926 |
| 1,734,948 | Nelson | Nov. 5, 1929 |
| 2,617,897 | Kessler | Nov. 11, 1952 |
| 2,623,956 | Kessler et al. | Dec. 30, 1952 |

OTHER REFERENCES

"Telephony," Atkinson, vol. II, pp. 769–770, 1948.